United States Patent [19]
Serasio

[11] 3,992,764
[45] Nov. 23, 1976

[54] METHOD OF FORMING A ROLLER CAGE

[75] Inventor: Frank John Serasio, Torrington, Conn.

[73] Assignee: The Torrington Company, Torrington, Conn.

[22] Filed: Sept. 22, 1975

[21] Appl. No.: 615,408

[52] U.S. Cl. .............................. 29/148.4 C; 308/217
[51] Int. Cl.$^2$ .......................................... B21D 28/00
[58] Field of Search ............... 29/148.4 C; 308/201, 308/217, 1

[56] References Cited
UNITED STATES PATENTS

| | | | |
|---|---|---|---|
| 3,228,090 | 1/1966 | Schaeffler | 29/148.4 C |
| 3,365,775 | 1/1968 | Cavagnero et al. | 29/148.4 C |
| 3,526,026 | 9/1970 | Warchol | 29/148.4 C |
| 3,535,964 | 10/1970 | Allman | 29/148.4 C |
| 3,878,705 | 4/1975 | Iffland | 29/148.4 C |
| 3,940,193 | 2/1976 | Molloy | 29/148.4 C |

Primary Examiner—M. H. Wood, Jr.
Assistant Examiner—Richard A. Bertsch
Attorney, Agent, or Firm—Frank S. Troidl

[57] ABSTRACT

Ridges are preferably rolled-formed into a long, flat metal strip; and pockets are also formed in the strip with their axes perpendicular to the ridges. The ridges are then flattened to form lateral projections extending into the pockets with the projections serving to retain rolling members placed in the pockets. A predetermined length of the metal strip is wrapped into an annular shape to form the cage.

8 Claims, 13 Drawing Figures

U.S. Patent Nov. 23, 1976 Sheet 1 of 2 3,992,764
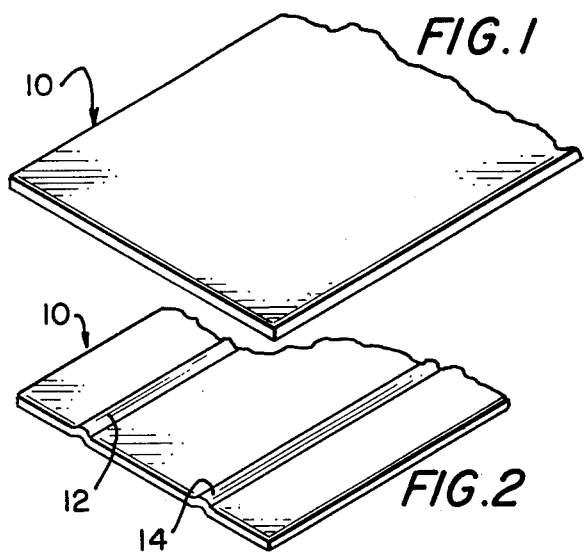
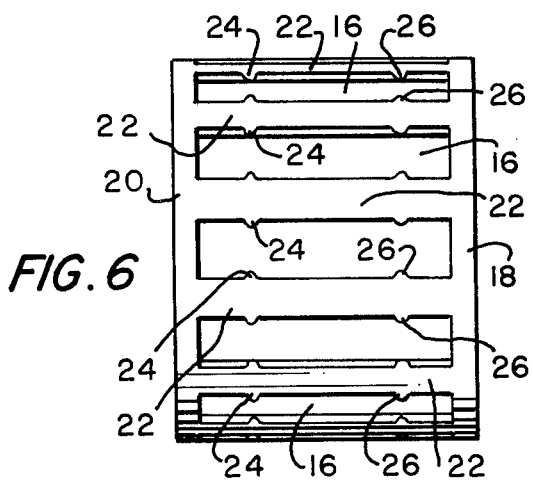
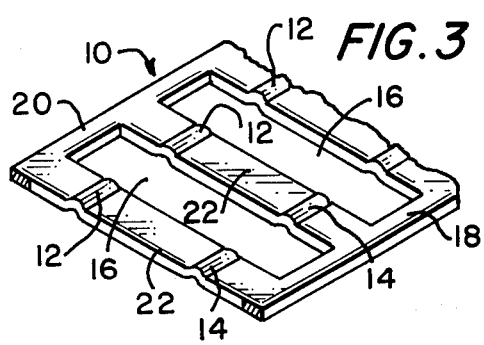
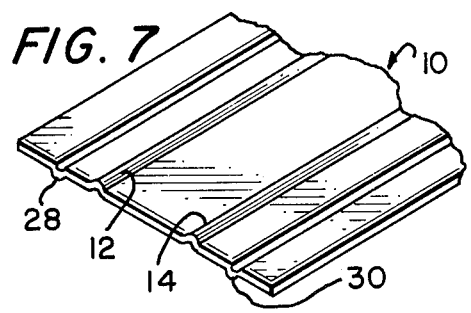
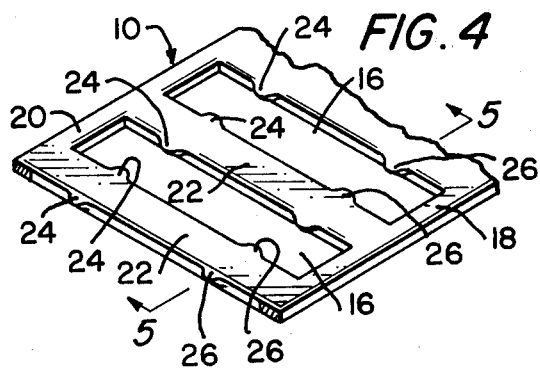
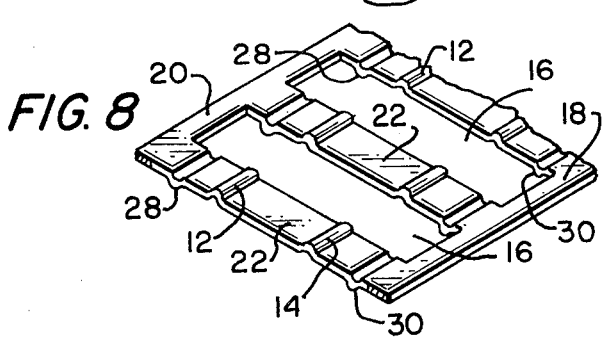
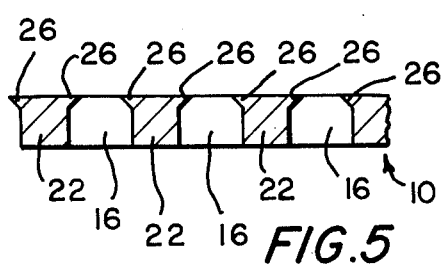
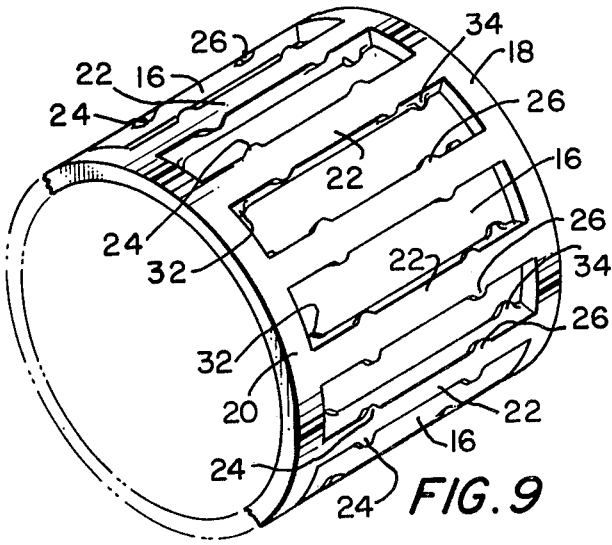

METHOD OF FORMING A ROLLER CAGE

This invention relates to antifriction bearings. More particularly, this invention is a new method of forming an antifriction bearing cage.

A particular advantage of this new method is that a long strip of metal may be formed with laterally separated longitudinal ridges above at least one surface of the strip. A similar ridge or ridges may also be raised above the opposite surface of the strip if this is desirable or necessary for the particular cages to be formed from that strip. The ridges are preferably roller formed but may be stamped or pressed if desired. Side flanges may be formed on the metal strip at the same time the ridges are formed or at another time, if such flanges are desired on the finished cage. The strip may either be stored for future use or used immediately for the manufacture of a large number of bearing cages which are all equal in axial length of cage but which may have different diameters and different bearing roller pockets sizes. Roller pockets are formed in the strip preferably by piercing, with the pockets having their axes perpendicular to the ridges. Preferably, the ridges are formed before the pockets are pierced, but under some circumstances it may be desirable to form the pockets before forming the ridges.

After the ridges and the roller pockets are made, the ridges are flattened down by rolling or pressing. This flattening causes material from the ridges to be flowed or formed or extruded into projections or tabs extending into each lateral side of the roller pockets near the surface of the strip on which the ridges had been formed. These projections are used to retain bearing rolling members placed in the pockets in the cage, with the lateral pocket width being slightly less than the roller diameter. While the ridges are being flattened, it may be necessary to restrain the sides of the flat strip against sideways movement, thus assuring that the projections from the ridges will be formed into the pockets and that the ridges will not just spread sideways forming a wider flat strip without causing the projections to form.

After the projections are formed, a predetermined length of the metal strip is cut and then wrapped into an annular shape. The circumferential ends of the strip are connected together by any appropriate means such as welding to form the bearing cage. For some cages, those ends are left free and unattached. Bearing rollers are pressed past the projections into the roller pockets or are inserted from the opposite side and are retained in the pockets by the projections.

The invention, as well as its many advantages will be further understood by reference to the following detailed description and drawings in which:

FIG. 1 is a perspective view showing a portion of a long metal strip from which a cage is to be made by our new method;

FIG. 2 is a perspective view showing the strip of FIG. 1 after a pair of lateral ridges have been rolled-formed in the metal strip;

FIG. 3 is a perspective view showing the strip after the ridges have been formed and the pockets have also been formed;

FIG. 4 is a perspective view showing the strip after the ridges have been flattened to form the projections;

FIG. 5 is a sectional view taken along lines 5—5 of FIG. 4;

FIG. 6 is a side elevational view showing the final cage after the metal strip is wrapped up and welded;

FIG. 7 is a perspective view showing a metal strip having a pair of laterally spaced ridges rolled-formed on both flat sides of the strip;

FIG. 8 is a perspective view showing the strip of FIG. 7 after the pockets have been formed in the strip;

FIG. 9 is a perspective view illustrating the cage formed after the strip of FIG. 8 has had the ridges flattened to form projections on both the upper and lower sides of the cage bars and the strip has been rolled into an annular shape;

Like parts in the various figures will be referred to by like numbers.

Figure 10:
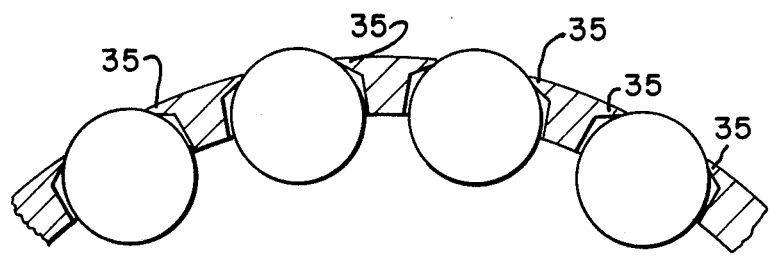
FIG. 10 is a sectional view of a thinner cage.

Referring to the figures and particularly to FIG. 1, the long, flat metal strip or plate 10 represents a portion of a long metal strip from which the bearing cage is to be formed. The strip may be relatively thick, that is greater than half the roller diameter, or relatively thin, that is less than half the roller diameter.

The pair of laterally spaced ridges 12 and 14 have been formed on the plate 10 (FIG. 2) preferably by a rolled-formed process. These ridges, however, can also be formed by pressing or stamping. They are not formed by machining, which removes metal.

The metal strip 10 with the laterally spaced ridges 12 and 14 is then pierced to form the rectangular pockets 16 as shown in FIG. 3. The long sides of the rectangular pockets 16 are perpendicular to the ridges 12 and 14. Preferably, the ridges 12 and 14 are formed before the pockets are pierced into the strip; however, if desired these steps may be reversed.

The piercing of the pockets 16 into the strip 10 results in a long metal strip having end rims 18 and 20 which are interconnected by the crossbars 22 containing the ridges 12 and 14.

The laterally separated ridges 12 and 14 are thereafter flattened to form the lateral projections 24 and 26 shown in FIG. 4. The lateral projections 24 and 26 are at the top surface of the crossbars 22 and each extend laterally into the pockets 16. While the ridges 12 and 14 are being flattened, the strip 10 may be held laterally by any well-known means to insure that the pressure exerted against the ridges 12 and 14 causes the ridges to be extruded into the pockets 16.

The long, flat strip may then be cut to a predetermined length, wrapped into an annular shape, and welded or mechanically joined or bonded by other well-known means to form the cage shown in FIG. 6. If desired, the cage may be formed with the circumferential ends left free and unattached. The cage includes the end rims 18 and 20 interconnected by crossbars 22 with the end rims and crossbars defining circumferentially separated pockets 16. The projections 24 and 26 which extend into the pockets 16 from the radially outside surface of the crossbars 22 will serve to prevent any rollers placed in the pockets 16 from falling outwardly from the pockets. In some cases where it is desired to use the projections to prevent the rollers from falling inwardly, as where the cage is used to hold rollers within an outer race or needle bearing cup, the strip will be wrapped up with projections, such as projection 27, at the inner surface of the cage as in FIG. 11.

If desired, a comparatively heavy wall with projections near the outside surface as in FIG. 5 to prevent the rollers from falling outwardly, may be provided; but with the radially inner edges of the pockets as pierced preventing the rollers from falling inwardly from the cage. The wrapping up of the strip causes these inner edges to draw close enough together to reduce the pocket opening at this inner surface to less than the roller diameter.

As shown in FIG. 7, a second pair of laterally spaced ridges 28 and 30 may be formed on the other surface or bottom surface of the long, flat metal strip 10. Ridges 28 and 30 are also laterally spaced from the ridges 12 and 14 formed on the top surface of the metal strip 10. Ridges 28 and 30 are also preferably rolled-formed, but may be pressed or stamped.

FIG. 8 shows the long metal strip of FIG. 7 after the pockets 16 have been pierced through the metal strip to form the rims 18 and 20 interconnected by the spaced crossbars 22 forming the rectangular pockets 16 with the long sides of the rectangular pockets being perpendicular to the ridges. As with the embodiment of FIGS. 2 through 6, the ridges are preferably formed before the pockets, but if desired, the pockets may be formed before the ridges.

The ridges 12 and 14 on the top surface of the strip 10 and the ridges 28 and 30 on the bottom surface of the strip 10 are then flattened while the lateral sides of the metal strip are held against lateral movement, to form projections extending laterally into the pockets 16 from both the top surface of the crossbars 22 and the bottom surface of the crossbars 22. The metal strip is then cut to the predetermined length, wrapped into an annular shape, and then welded or otherwise bonded to form the cage shown in FIG. 9. This cage includes end rims 18 and 20 and crossbars 22 which define circumferentially spaced pockets 16. In addition to the projections 24 and 26, extending laterally into the pockets 16 from the radial outside of the crossbars 22, the lateral projections 32 and 34 formed when the ridges 28 and 30 of FIG. 8 were flattened extend into the pockets 16 from the radial inside of crossbars 22. These lateral projections 32 and 34 prevent a roller placed in the pockets 16 from falling inwardly. Thus, the cage shown in FIG. 9 may be used to prevent both inward and outward falling of the rollers from pockets 16.

While the preferred number of ridges on each surface of the strip is two, it is also practical to have two spaced ridges on one surface and just one ridge on the second surface spaced laterally between the two ridges on the first surface. Similarly, it is possible and practical to form more than two ridges on either or both surfaces, with projections from all the ridges extending into the roller pockets.

The invention is also used in linear bearing assemblies where plain reciprocating linear motion, as in machine guideways, is involved. In this case, of course, the strip remains straight and is not wrapped up into an annular cage. If it is only desired to retain rollers in one direction, the strip of FIG. 5 may be used.

It is not necessary that the ridges be flattened down to the flat surface of the strip, but only that they be flattened enough to produce the desired roller-retention projections in the roller pockets. Indeed, flattening down flush to the flat surface would be difficult.

Figure 11:
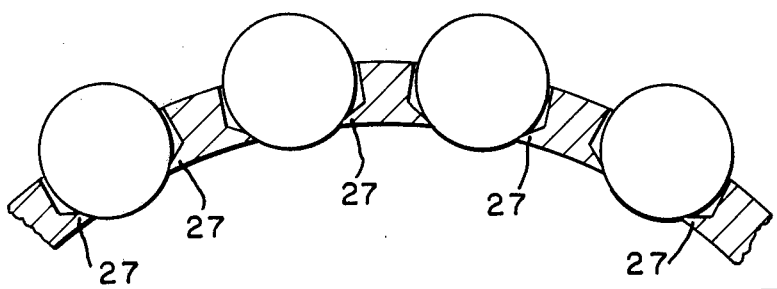
FIG. 11 is a sectional view of a cage made of the same strip as the cage of FIG. 10 but with the strip wrapped up in the opposite curvature.

FIG. 10 shows a cross-section of a cage made from the same strip as the cage of FIG. 11 but with the strip wrapped around in the opposite direction so that the rollers are prevented from falling radially outwardly by projections 35.

Figure 12:
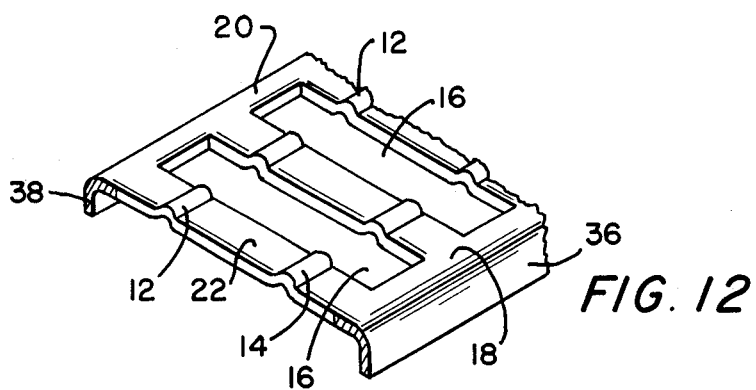
FIG. 12 is a perspective view showing a strip similar to the strip of FIG. 3 but with the addition of side flanges.
Figure 13:
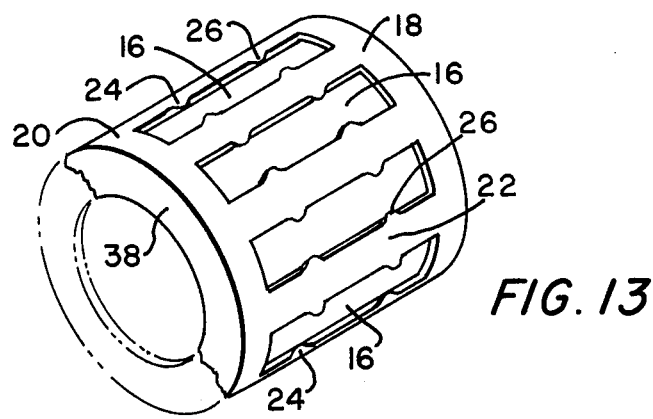
FIG. 13 is a perspective view showing the cage made from the wrapped up and welded strip of FIG. 12.

FIG. 12 is a perspective view of a strip with formed ridges and roller pockets similar to the strip of FIG. 3 but with the added feature of side flanges 36 and 38 formed perpendicular to the strip at each lateral side. If a particular cage required it, only one such side flange would be formed on the strip. The wrapped up annular cage made from this strip is shown in perspective in FIG. 13 with the flanges directed radially inward. Similarly, the cage could be formed with the flanges directed radially outwardly. Each cage could have the roller retention formed at either surface as desired.

I claim:

1. A method of forming a cage for a bearing comprising: first, forming laterally separated longitudinal ridges on at least one flat side of a metal strip, then forming rectangular pockets having their long sides perpendicular to said ridges, then flattening the ridges to form projections extending into the pockets; and then cutting off a predetermined length of strip.

2. The method of forming a cage for a bearing which comprises: first, forming laterally separated longitudinal ridges on at least one flat side of a metal strip; then cutting off a predetermined length of strip; then forming rectangular pockets having their long sides perpendicular to said ridges; and then flattening the ridges to form projections extending in the pockets.

3. The method of forming a cage for a bearing which comprises: first, forming rectangular pockets in a metal strip; then forming laterally separated longitudinal ridges on at least one flat side of the metal strip, with the long sides of the rectangular pockets being perpendicular to said ridges; then flattening the ridges to form projections extending into the pockets; and then cutting off a predetermined length of strip.

4. The method of forming a cage for a bearing which comprises: first, forming rectangular pockets in a metal strip; then forming laterally separated longitudinal ridges on at least one flat side of the metal strip with the long sides of the rectangular pockets being perpendicular to said ridges; then cutting off a predetermined length of strip; and then flattening the ridges to form projections extending into the pockets.

5. A method of forming a cage for a rolling member bearing comprising: forming laterally separated longitudinal ridges on at least one flat side of a metal strip, and forming rectangular pockets having their long sides perpendicular to said ridges; flattening the ridges to form projections extending into the pockets for retaining rolling members placed in the pockets; and wrapping a predetermined length of strip into a substantially annular member.

6. The method of forming a bearing cage in accordance with claim 5 wherein the ridges are rolled formed.

7. The method of forming a bearing cage in accordance with claim 6 wherein a first pair of ridges is rolled formed on one flat side of the metal strip and a second pair of ridges is rolled formed on the other flat side of the metal strip; and both pairs of ridges are flattened to form projections for retaining rolling members placed in the pockets.

8. The method of forming a bearing cage in accordance with claim 5 wherein at least one flange is formed on one longitudinal side of the metal strip.

* * * * *